Patented July 26, 1938

2,124,531

UNITED STATES PATENT OFFICE 2,124,531

METHOD OF TREATING MINERAL OILS

Franz Rudolf Moser, Amsterdam, Netherlands, assignor to Shell Development Company, San Francisco, Calif., a corporation of Delaware No Drawing. Application November 22, 1933, Serial No. 699,136. In the Netherlands November 23, 1932

12 Claims. (Cl. 196—18)

My invention relates to a process for the manufacture of oils entirely or partly freed from paraffin wax and for the manufacture of paraffin wax from paraffinous oils.

It is known that on the distillation of paraffinous crude hydrocarbon oils, paraffinous distillates and residues are obtained, from which the paraffin wax is often difficult to remove, whereas an easy removal is essential for the manufacture of such oils as lubricating oil and fuel oil coming up to specific requirements with regard to the pour point. In so far as these paraffinous distillates and residues are not easily filtrable, recourse has hitherto been had to a redistillation or to centrifuging, which may be either combined or not with other means of promoting the separation of the paraffin wax. In this connection it is important to note that redistillation in particular has the drawback of unfavourably affecting the quality of the paraffin wax and making it less suitable for the manufacture of ceresine.

This invention provides a simple means for easily separating the paraffin wax from mineral oils. The process according to the invention consists in admixing to the wax-containing oil of a substance capable of reducing the pour point of a paraffin base oil, cooling the mixture to solidify the wax to non-filtrable state, and separating the solidified paraffin wax by either settling or filtration or centrifuging, or any other similar method.

It is known to reduce the pour point of paraffinous oils by the addition of certain special substances. I have now found that the admixture of these substances tends to promote an easy removal of the paraffin wax, for example by filtration. This phenomenon presumably has to be accounted for by the fact that the pour point reducing substances influence the growth of the paraffin wax crystals in such a manner that crystal aggregates are formed, which on filtration produce a more or less porous cake easily permeable to oil. A large number of pour point reducing substances were examined and it may be stated as a rule that all substances capable of reducing the pour point of paraffinous oils also have the property of promoting the separation of the paraffin wax. Although the said two phenomena, viz. the pour point reduction and the improved separation of paraffin wax, are not always entirely interdependent, it may in general be said that the most active pour point reducing substances also give the bests results in respect of promoting the separation of paraffin wax.

Examples of such substances are pyrogenetic condensation (polymerization) products of mineral, vegetable, animal oils and fatty acids, such as distillation residues, asphalt (especially the harder kinds), cracked residues, polymerized Edeleanu extract, stearine pitch, or fractions thereof, which are rich in substances possessing pour point reducing properties. Methods of concentrating such substances as alkyl picenes and the like are fully described in the copending application Serial No. 690,949. In that application I have described and claimed a method of lowering the pour point of mineral oil by incorporating into said oil the active substances precipitated from pyrogenous condensation products of mineral oil, such as cracked residues or polymerized Edeleanu extracts with precipitants for asphaltenes it also relates to various methods of recovering the active bodies from various hydrocarbon mixtures which have been subjected to polymerization or condensation treatment, and of concentrating the active bodies. One of these methods comprises the steps of mixing the condensation products with a liquid precipitant for asphaltenes, such as a low-boiling naphtha, or gasoline, preferably low in aromatics, or other similar precipitants, such as butane, pentane, alcohol-ether mixtures, whereby the less active constituents of the condensation products are dissolved, and the active pour point reducing substances are precipitated; they may be separated from the solution by filtration or decantation.

According to another concentration method, the condensation products are subjected to a heat treatment, preferably under non-cracking conditions, e. g., at 350° C. This may be effected in a closed vessel. Also, the condensation products may be distilled, either with or without steam, vacuum, and other known aids to distillation. This distillation further reduces the condensation products and concentrates the active pour point reducing substances in the distillation residue (so that later less precipitant is required) and may also increase the activity of the pyrogenic condensation products. It is evident that the heating treatment at or about 350° C. and the distillation as described above, may be combined. The heat treated and/or distilled products may then be mixed with the precipitant for asphaltenes, as described above.

According to a modified mode of extracting the desired pour point reducing material, the pyrogenic condensation products are first dissolved in a heavy, high-boiling mineral oil, such as a distillate boiling above 225° C., and preferably above 300° C., like stove oil, gas oil, or Edeleanu extract, or other oils with similarly high contents of aromatic (15% or more), thereby forming a first solution which may be readily separated from granular and gritty material which is precipitated from it. The resulting solution of heavy oil may then be mixed with the above described precipitant for asphaltenes to precipitate the most active pour point reducing substances, which may then be separated from the liquid solution by filtration or decantation. If desired, all or a portion of the heavy oil may be distilled from the first solution before treatment with the precipitant for asphaltenes.

Further substances that may be employed are various pour point reducing metallic soaps, e. g. aluminum stearate; compounds obtained by coupling paraffinous hydrocarbons to aromatic hydrocarbons of high molecular weight, as described in the patent to Van Peski, No. 2,073,080; and in particular highly condensed aromatic hydrocarbons and organic compounds built up of nuclei of five and/or six atoms and preferably with long side chains, so that in a mono-nucleus system there is more than one side chain and in a poly-nucleus system there is at least one side chain, the nuclei and/or side chains containing nitrogen and/or oxygen. The pour point reducing agents of the last group, such as esters of fatty acids and aromatics and the like, are further described in the patent to Van Peski, No. 2,053,853.

The separation of the paraffin wax after addition of the pour point reducing substances can be effected by filtration, sedimentation and centrifuging, or by a combination of these methods. As a rule the filtration method will be followed. Continuous filters may be used.

The process according to the invention may be applied to every paraffinous oil; it is particularly important for dewaxing lubricating oil and fuel oil stocks.

The temperature of addition of the pour point reducing substances may vary and depends on the solubility of these substances in the oil to be dewaxed. The addition should take place at such a temperature at which the paraffin wax has not yet or not entirely crystallized out. Also the exact quantity of the pour point reducer should be determined experimentally in each case; it may vary from some tenths of a per cent. to about 5 per cent. In some cases, even larger quantities may be added; for example when a blended oil, consisting of two components; straight run wax-containing distillate and a cracked oil, is desired as the ultimate product, then a quantity of the cracked oil containing concentrated active pour point reducers may be added to the first mentioned component oil, and the mixture then dewaxed under favourable conditions, due to the presence of said pour point reducers.

After the separation of the paraffin wax the products may be further treated in the usual manner by refining, etc. The paraffin wax obtained from distillation residues under conditions of this invention has a very high melting point, is of fine crystalline structure and constitutes an excellent base material for the manufacture of ceresine.

The following data give some idea of the extremely good results which can be obtained when applying the process according to the invention.

A lubricating oil fraction with a pour point of 290° C. appeared to be practically unfiltrable. When filtering at a temperature of 14° C. 1800 sec. were required to obtain a certain quantity of filtrate. On adding to the oil 2% of a Dubbs cracked residue prior to the crystallization of the paraffin wax, and under conditions which for the rest were completely identical, an equal quantity of filtrate was obtained in 105 sec.. In the latter case the pour point of the filtrate was 11° C., whilst in the former case it was 14° C. The pour point of these filtrates may, of course, be reduced by a further addition of pour point reducing substances. A lower pour point of the filtrate can also be obtained by admixing to the unfiltered oil a larger quantity of a pour point reducing substance.

In this connection it may be observed that the pour point of the filtrate is determined by the temperature at which the paraffin wax is filtered. In general it is found that the pour point reducing substances do not affect or only slightly affect the pour point of the filtrate, because they are absorbed by the paraffin wax. If, however, a large quantity of pour point reducing substance is added, the filtrate may show a markedly reduced pour point.

A so-called wax residue with a pour point of 39° C., which was entirely solid and unfiltrable at 25° C., could be converted by addition of 5% cracked residue to an oil which was liquid and filtrable at 25° C.

In the connection with the definition of the process according to the invention as given above, it may be remarked that the pour point reducing substances which are added to highly paraffinous oils with a view to promoting the separation of the paraffin wax, need not necessarily affect the pour point of these oils. Indeed, it was noted, that often the pour point reducers which are active, i. e. lower the pour point, in case of one paraffin base oil, are inactive in case of a paraffin base oil of different origin. However, the dewaxing effect of the same pour point reducers upon both oils was always favourable, i. e. resulted in greater yields of dewaxed oils and a higher quality of the paraffin wax. In some cases, the pour point of oils with very high content of paraffin wax cannot be reduced by the addition of known pour point reducing substances. Usually the pour point reducing activity of such substances is most prominent in the case of oils containing not too high a percentage of paraffin wax. Yet also in those cases where the pour point reducing action is not noticeable, there is a marked improvement in the separation of the paraffin wax from such oils. Consequently the effect of the improved separation cannot be ascribed to the pour point reducing action of the admixed substances.

I claim as my invention:

1. In the process of dewaxing paraffinous oils, the steps which comprise admixing to the paraffinous wax-containing oil an effective quantity of pour point reducing substance consisting only of the portion of a polymerized material which is insoluble in liquid precipitants for asphaltenes, said material being selected from the group: mineral, animal and vegetable oils, and fatty acids, subsequently chilling the mixture to solidify wax into filterable wax crystals, and filtering the chilled mixture to separate the crystallized wax therefrom.

2. The process according to claim 19 in which the polymerized material is subjected to a heat treatment at about 350° C. prior to its separation into portions which are soluble and insoluble in precipitants for asphaltenes.

3. In the process of dewaxing paraffinous oils, the steps which comprise admixing to the paraffinous wax-containing oil an effective quantity of polymerized liquid $SO_2$-soluble mineral oil extract, subsequently chilling the mixture to solidify wax into filterable wax crystals, and filtering the chilled mixture to separate crystallized wax therefrom.

4. In the process of dewaxing paraffinous oils, the steps which comprise admixing to the paraffinous wax-containing oil an effective quantity of a pour point reducing substance consisting only of the portion of a polymerized mineral oil which is insoluble in liquid precipitants for asphaltenes, subsequently chilling the mixture to solidify wax into filterable crystals, and filtering the chilled mixture to separate the crystallized wax therefrom.

5. The process according to claim 22 in which the polymerized oil is subjected to a heat treatment of about 350° C. prior to its separation into portions which are soluble and insoluble in precipitants for asphaltenes.

6. The process according to claim 22 in which the polymerized oil is a cracked residue.

7. The process according to claim 22 in which the polymerized oil is a polymerized liquid $SO_2$ soluble mineral extract.

8. The method of dewaxing wax-bearing mineral oil which comprises commingling said oil with a wax separation aid consisting of those constituents of cracked residuum which are substantially insoluble in light petroleum naphtha, chilling the mixture to precipitate wax and removing the precipitated wax from the oil.

9. A process for the separation of wax from a wax bearing oil which comprises commingling said oil with constituents of a cracked petroleum residuum consisting of those fractions of said cracked residuum which are substantially insoluble in petroleum naphtha at ordinary temperatures and substantially soluble in lubricating oil at ordinary temperatures, cooling the mixture to precipitate wax and removing the wax from the chilled mixture.

10. In the process of dewaxing paraffinous oils, the steps which comprise admixing to the paraffinous wax-containing oil a pour point reducing substance consisting only of the portion of a polymerized material which is insoluble in liquid precipitants for asphaltenes, said material being selected from the group: mineral, animal and vegetable oils, and fatty acids, chilling the mixture to solidify wax, and removing the solidified wax from the oil.

11. The process according to claim 10 in which the polymerized material is subjected to a heat treatment at about 350° C. prior to its separation into portions which are soluble and insoluble in precipitants for asphaltenes.

12. In the process of dewaxing paraffinous oils, the steps which comprise admixing to the paraffinous wax-bearing oil a polymerized liquid $SO_2$-soluble mineral oil extract, chilling the mixture to solidify wax, and removing the solidified wax from the oil.

FRANZ RUDOLF MOSER.

CERTIFICATE OF CORRECTION.

Patent No. 2,124,531. July 26, 1938.

FRANZ RUDOLF MOSER.

It is hereby certified that error appears in the printed specification of the above numbered patent requiring correction as follows: Page 2, second column, line 71, claim 2, for the claim reference numeral "19" read 1; page 3, first column, lines 20, 25 and 27, claims 5, 6 and 7 respectively, for "22" read 4; and that the said Letters Patent should be read with this correction therein that the same may conform to the record of the case in the Patent Office.

Signed and sealed this 6th day of September, A. D. 1938.

Henry Van Arsdale (Seal) Acting Commissioner of Patents.